(12) United States Patent
Fan

(10) Patent No.: US 9,234,588 B2
(45) Date of Patent: Jan. 12, 2016

(54) FLEXIBLE STUFFING BOX PACKING ASSEMBLY

(71) Applicant: JDV CONTROL VALVES CO., LTD., Tao Yuan Hsien (TW)

(72) Inventor: Yi-Ming Fan, Taoyuan Hsien (TW)

(73) Assignee: JDC CONTROL VALVES CO., LTD., Tao Yuan Hsien (TW)

( * ) Notice: Subject to any disclaimer, the term of this patent is extended or adjusted under 35 U.S.C. 154(b) by 192 days.

(21) Appl. No.: 14/100,010

(22) Filed: Dec. 8, 2013

(65) Prior Publication Data

US 2015/0159756 A1 Jun. 11, 2015

(51) Int. Cl.
*F16J 15/18* (2006.01)

(52) U.S. Cl.
CPC .................. *F16J 15/188* (2013.01); *F16J 15/18* (2013.01)

(58) Field of Classification Search
CPC ............ F16J 15/18; F16J 15/188; F16J 15/00
USPC ........................... 277/308, 510, 529, 540, 536
See application file for complete search history.

(56) References Cited

U.S. PATENT DOCUMENTS

| | | | | |
|---|---|---|---|---|
| 511,734 | A * | 12/1893 | Hofpstadt | F16J 15/20 277/530 |
| 3,098,660 | A * | 7/1963 | Hausner | F16J 15/20 277/530 |
| 6,182,974 | B1 * | 2/2001 | Harrelson, III | F16J 15/184 277/531 |
| 9,027,906 | B2 * | 5/2015 | Kung | F16K 41/02 251/214 |

* cited by examiner

*Primary Examiner* — Vishal Patel
*Assistant Examiner* — Thomas Neubauer
(74) *Attorney, Agent, or Firm* — Muncy, Geissler, Olds & Lowe, P.C.

(57) ABSTRACT

A flexible stuffing box packing assembly has fifth rings which are placed within a stuffing box. The pressures are transferred along the sequence of the first, second, third, fourth and fifth rings. The gaps between the first and second rings and between the fourth and fifth rings provide a space for expansion of the rings. The V shape recesses in various rings provide margins for the materials of the rings to expansion. Therefore, the structure provides that all rings can expand effectively without destroying the seal structure and the stresses from various rings will disperse effectively so that lifetime of the rings are prolong.

5 Claims, 5 Drawing Sheets

FLEXIBLE STUFFING BOX PACKING ASSEMBLY

FIELD OF THE INVENTION

The present invention related to packing assemblies, and in particular to a flexible stuffing box packing assembly.

BACKGROUND OF THE INVENTION

The prior art stuffing box packing set is commonly formed by at least one packing which is installed within a stuffing box. The stuffing box comprises a bottom, wall belong to a first device and an upper wall belong to a second device. A shaft passes through the first device, the stuffing box and the second device. The shaft is rotatable along an axis thereof. Oil is filled in the stuffing box. However, in this structure, a very good oil seal effect is needed to insure that no oil will flow out of the stuffing box. Therefore, the structure of the packing is very important for assuring the preferred oil sealing effect.

In one prior art, U.S. Pat. No. 5,806,959 discloses a compact five ring stuffing box packing assembly includes high density metal inserted braided and rings of graphite which have each been die formed to have angled facing surfaces. Three low density graphite perform rings having angled facing surfaces are contained between the high density braided end rings. The facing surfaces of the perform rings extend at a different angle relative to the longitudinal axis of the packing assembly than to do the facing surfaces of the braided end rings. The braided end rings provide a support function for the perform rings as well as a stem wiping function.

The above mentioned structure can suffer from the pressure from the upper side, but they cannot effectively disperse the pressure along the radial direction so that when the packing assembly is used for a longer time, the packing pieces of the assembly will be destroyed. As a result, the destroyed piece must be updated and thus the lifetime of the packing is short.

SUMMARY OF THE INVENTION

Accordingly, the object of the present invention is to provide a flexible stuffing box packing assembly, which includes fifth packing ring; wherein in application, the pressures are transferred along the sequence of the first, second, third, fourth and fifth rings. The gaps between the first and second rings and between the fourth and fifth rings provide a space for expansion of the rings. The V shape recesses in various rings provide margins for the materials of the rings to expansion. Therefore, the structure provides that all rings can expand effectively without destroying the seal structure and the stresses from various rings of the present invention will disperse effectively so that lifetime of the rings are prolong.

To achieve above object, the present invention provides a flexible stuffing box packing assembly includes a first ring, a second ring, a third ring, a fourth ring and a fifth ring; each of first, second, third, fourth, and fifth ring being a round ring and having respective first, second, third, fourth and fifth inner cylinder and respective outer cylinders; each inner cylinders being an equal radial cylinder and all the inner cylinders having an identical radius; and each outer cylinder being an equal radius cylinder and all the outer cylinders having an identical radius; the inner and outer cylinder for each of first, second, third, fourth and fifth rings being coaxial; and wherein an upper surface of the first ring is a flat surface between an upper edge of the first inner cylinder and the upper edge of the first outer cylinder and is vertical to the axial of the first inner cylinder and first outer cylinder; and a lower surface of the first ring is inclined downwards from the first inner cylinder to the first outer cylinder; an upper surface of the second ring being inclined downwards from second inner cylinder to the second outer cylinder; a lower surface of the second ring being a plane with an annular triangular recess formed in a center of the lower surface of the second ring; an upper surface of the third ring being a plane with an annular triangular recess formed in the center of the upper surface of the third ring; a lower surface of the third ring being a plane with an annular triangular recess formed in the center of the lower surface of the third ring; an upper surface of the fourth ring being a plane with an annular triangular recess formed in the center of the lower surface of the fourth ring; an lower surface of the fourth ring being inclined upwards from fourth inner cylinder to the fourth outer cylinder; and a lower surface of the fifth ring being inclined downwards from the fifth outer cylinder to the fifth inner cylinder; a lower surface of the fifth ring being a flat surface between a lower edge of the fifth inner cylinder and a lower edge of the fifth outer cylinder and being vertical to the axis of the fifth inner cylinder and fifth outer cylinders; and wherein in installation, the first, second, third, fourth and fifth rings are sequentially overlapped one by one so that all the inner cylinders are formed along a smooth inner surface and all the outer cylinders are formed as a smooth outer surface so as to have a very tightly fluid sealed structure.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
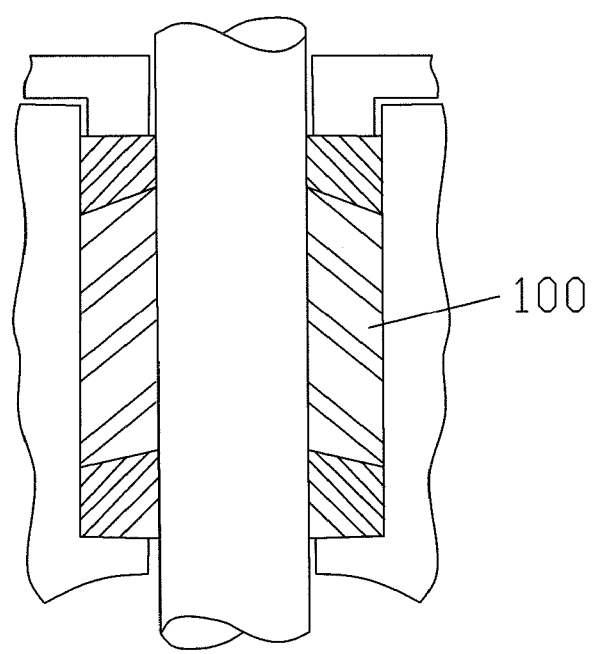
FIG. 1 is a cross sectional view showing a prior art packing assembly.
Figure 2:
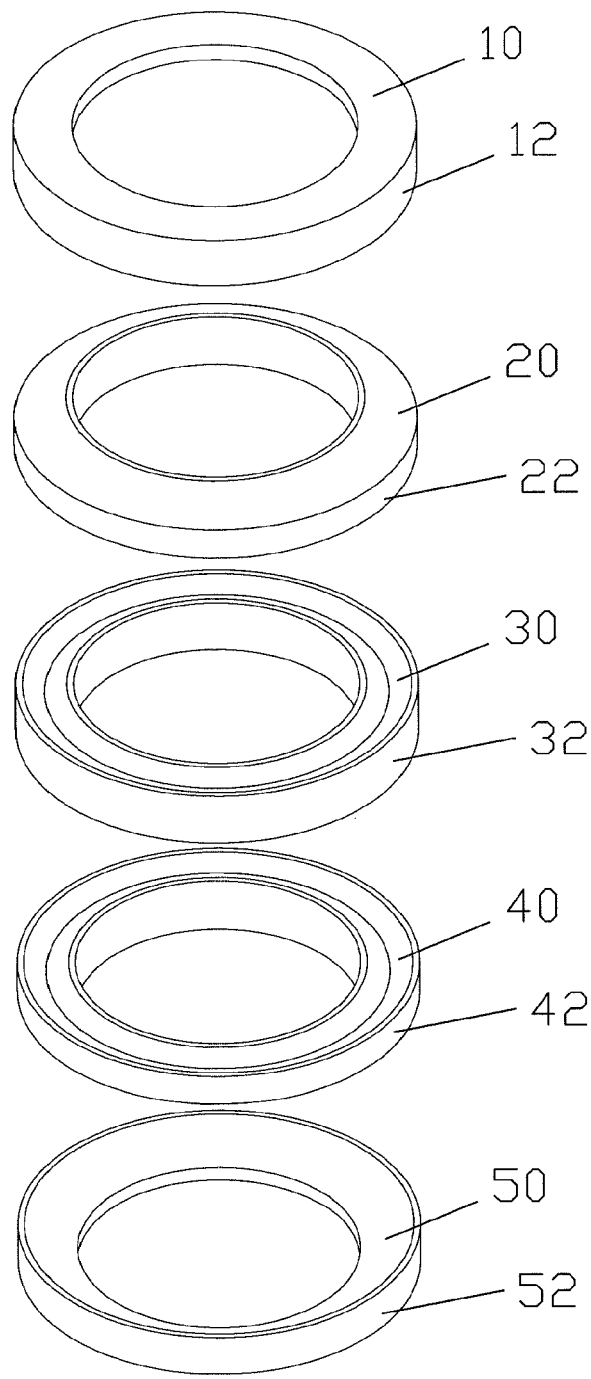
FIG. 2 is a perspective view about the packing assembly of the present invention, which is viewed from an upper side.
Figure 3:
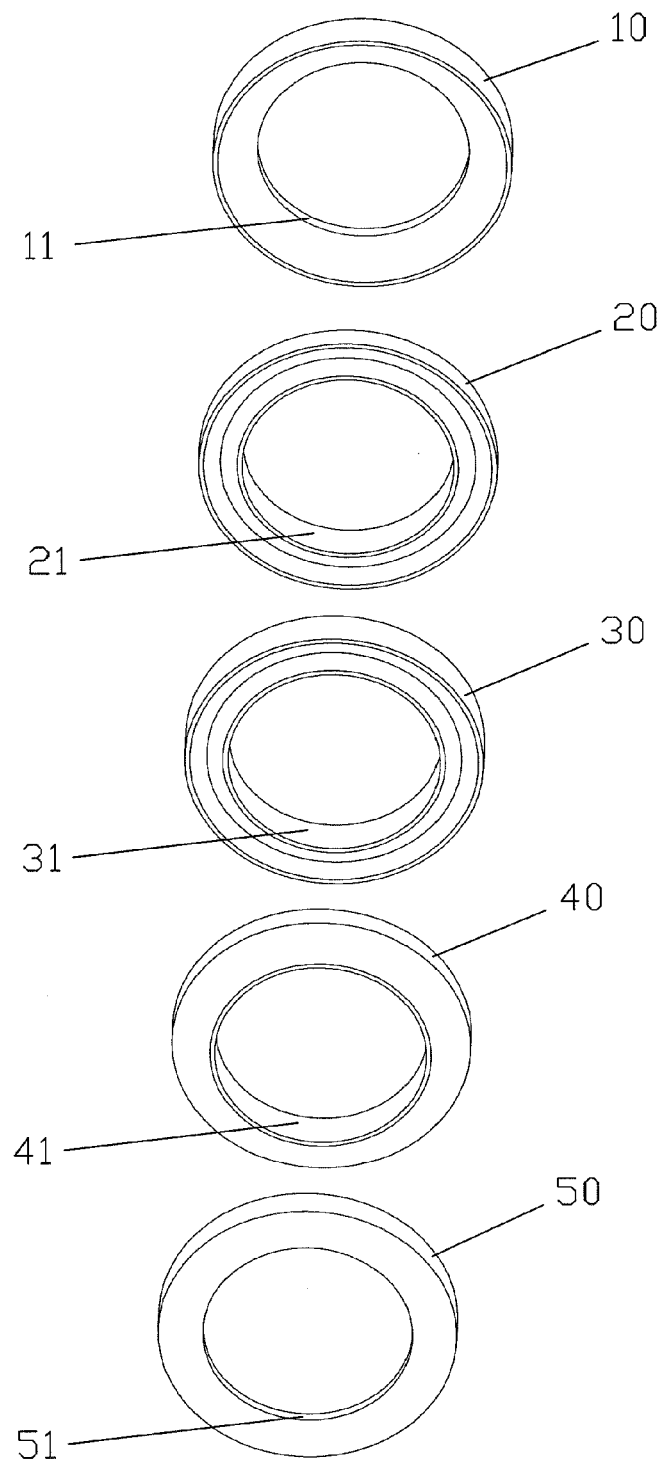
FIG. 3 is a perspective view about the packing assembly of the present invention, which is viewed from a lower side.

A flexible sealing packing assembly has the following elements with reference to FIGS. 2 and 3.

A first ring 10 is a round ring which is found by a first inner cylinder 11 and a first outer surface 12. Each of the first inner cylinder 11 and second outré cylinder 12 of the first ring 10 is an equal radial cylinder in an axial direction thereof. The first inner cylinder and first outer cylinder 12 are coaxial. An upper surface of the first ring 10 is a flat surface between an upper edge of the first inner cylinder 11 and the upper edge of the first outer cylinder 12 and is vertical to the axial of the first inner cylinder 11 and first outer cylinder 12; and a lower surface of the first ring 10 is inclined downwards from the first inner cylinder 11 to the first outer cylinder 12.

A second ring 20 is a round ring which is found by a second inner cylinder 21 and a second outer surface 22. Each of the second inner cylinder and second outer cylinder 22 of the second ring 20 is an equal radial cylinder in an axial direction thereof. The second inner cylinder and second outer cylinder 22 are coaxial. An upper surface of the second ring 20 is inclined downwards from second inner cylinder 21 to the second outer cylinder 22. A lower surface of the second ring 20 is a plane with an annular triangular recess 23 formed in the center of the lower surface of the second ring 20. The inclination of the upper surface of the second ring 20 is greater than that of the lower surface of the first ring 10 so that when second ring 20 is overlapped with the first ring 10, a gap is formed therebetween.

A third ring 30 is a round ring which is found by a third inner cylinder 31 and a third outer surface 32. Each of the third inner cylinder 31 and third outer cylinder 32 of the third ring 30 is an equal radial cylinder in an axial direction thereof. The third inner cylinder and third outer cylinder 32 are coaxial. An upper surface of the third ring 30 is a plane with an annular triangular recess 33 formed in the center of the upper surface of the third ring 30. A lower surface of the third ring 30 is a plane with an annular triangular recess 34 formed in the center of the lower surface of the third ring 30.

A fourth ring 40 is a round ring which is found by a fourth inner cylinder 41 and a fourth outer cylinder 42. Each of the fourth inner and fourth outer cylinders 41, 42 of the fourth ring 40 is an equal radial cylinder in an axial direction thereof. The fourth inner cylinder 41 and fourth outer cylinder 42 are coaxial. An upper surface of the fourth ring 40 is a plane with an annular triangular recess 43 formed in the center of the lower surface of the fourth ring 40. A lower surface of the fourth ring 40 is inclined upwards from fourth inner cylinder 41 to the fourth outer cylinder 42.

Preferably, the fourth ring 40 is symmetrical to the second ring 20 along a plane between the second and fourth rings parallel to an axial plane of the second ring.

A fifth ring 50 is a round ring which is found by a fifth inner cylinder 51 and a fifth outer surface 52. Each of the fifth inner cylinder 51 and fifth outer cylinder 52 of the fifth ring 50 is an equal radial cylinder in an axial direction thereof. The fifth inner cylinder and second outer cylinder 52 are coaxial. A lower surface of the fifth ring 50 is inclined downwards from the fifth outer cylinder 52 to the fifth inner cylinder 51. A lower surface of the fifth ring 50 is a flat surface between a lower edge of the fifth inner cylinder 51 and a lower edge of the fifth outer cylinder 52 and is vertical to the axis of the fifth inner cylinder 51 and fifth outer cylinders 52.

Preferably, an axial length of the fifth inner cylinder 51 is shorter than that of the first inner cylinder 11; and an axial length of the fifth outer cylinder 52 is longer than that of the first outré outer cylinder 12.

Preferably, the inclination of the upper surface of the fifth ring 50 is greater than that of the lower surface of the fourth ring 40 so that when the fifth ring 50 is overlapped with the fourth ring 40, a gap is formed therebetween.

All of the first, second, third, fourth, and fifth inner cylinders 11, 21, 31, 41, and 51 have identical radius; and all of the first, second, third, fourth and fifth outer cylinder 12, 22, 32, 42, and 52 have identical radius.

Figure 4:
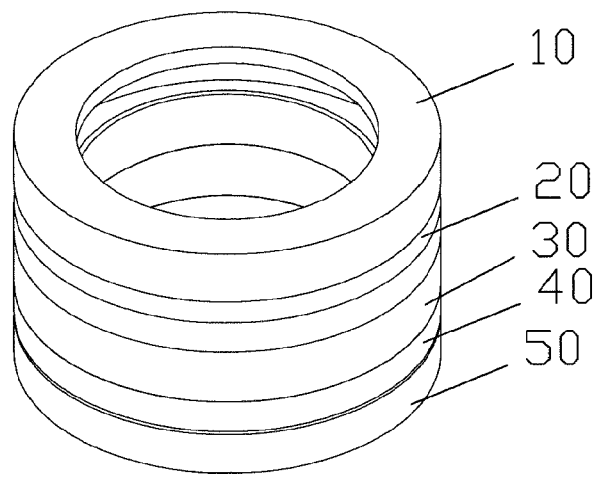
FIG. 4 shows an assembly view of the packing assembly of the present invention.
Figure 5:
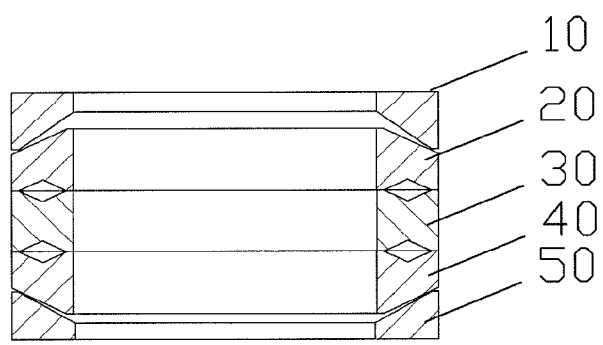
FIG. 5 is an assembly cross sectional view about the packing assembly of the present invention.

With reference to FIGS. 4 and 5, in installation of the present invention, the first, second, third, fourth and fifth rings are sequentially overlapped one by one so that all the inner cylinders 11, 21, 31, 41 and 51 are formed along a smooth inner surface and all the outer cylinders 12, 22, 32, 42 and 52 are formed as a smooth outer surface so as to have a very tightly fluid sealed structure.

Figure 6:
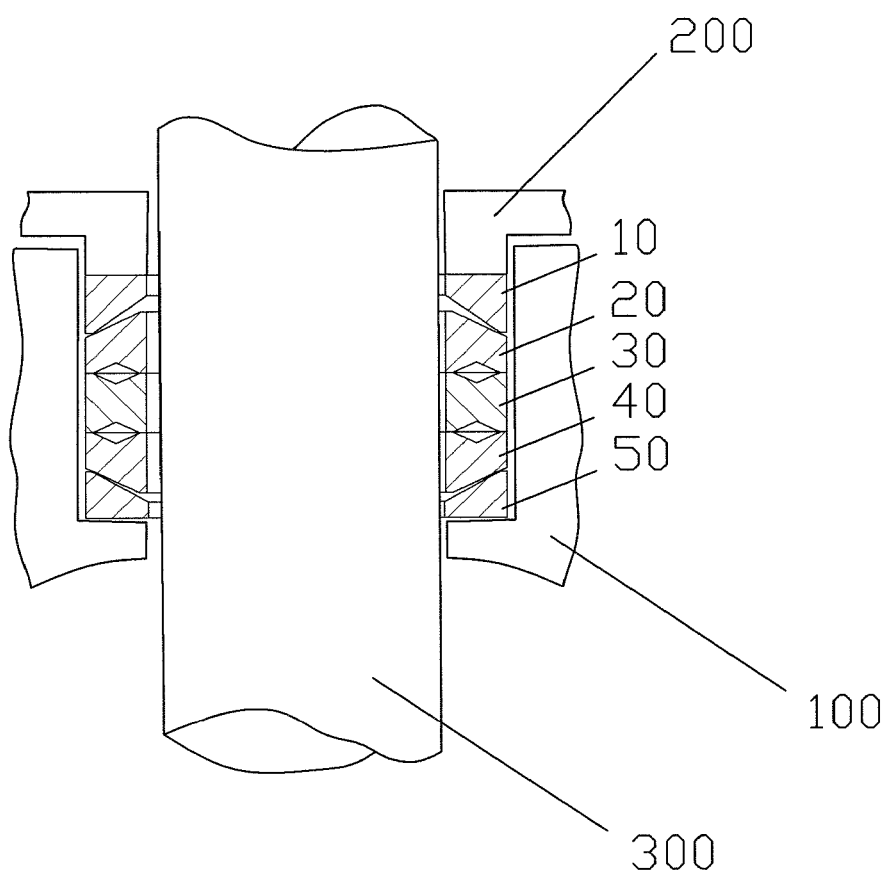
FIG. 6 shows the application of the present invention, in that the packing assembly is assembled to a stuffing box.

With reference to FIG. 6, in application, the assembled rings 10, 20, 30, 40 and 50 are placed within a stuffing box within a first device 100 and a spindle 100 passes through a center of the ring assembly into a second device 200. The ring assembly surrounds the spindle 300 to form with a tightly fluid sealed structure. The pressures are transferred along the sequence of the first, second, third, fourth and fifth rings 10, 20, 30, 40 and 50. The gaps between the first and second rings and between the fourth and fifth rings provide a space for expansion of the rings. The V shape recesses in various rings provide margins for the materials of the rings to expansion. Therefore, the structure provides that all rings can expand effectively without destroying the seal structure and the stresses from various rings of the present invention will disperse effectively so that lifetime of the rings are prolong.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A flexible, stuffing box packing assembly comprising:
a first ring, a second ring, a third ring, a fourth ring and a fifth ring (10, 20, 30, 40 50); each of first, second, third, fourth, and fifth ring being a round ring and having respective first, second, third, fourth and fifth inner cylinder (11, 21, 31, 41, 51) and respective outer cylinders (12, 22, 32, 42, 52); each inner cylinders being an equal radial cylinder and all the inner cylinders having an identical radius; and each outer cylinder being an equal radius cylinder and all the outer cylinders having an identical radius; the inner and outer cylinder for each of first, second, third, fourth and fifth rings being coaxial; and wherein an upper surface of the first ring (10) is a flat surface between an upper edge of the first inner cylinder (11) and the upper edge of the first outer cylinder (12) and being vertical to the axial of the first inner cylinder (11) and first outer cylinder (12); and a lower surface of the first ring 10 is inclined downwards from the first inner cylinder (11) to the first outer cylinder (12);

an upper surface of the second ring (20) being inclined downwards from second inner cylinder (21) to the second outer cylinder (22); a lower surface of the second ring (20) being a plane with an annular triangular recess (23) formed in a center of the lower surface of the second ring (20);

an upper surface of the third ring (30) being a plane with an annular triangular recess (33) formed in a center of the upper surface of the third ring (30); a lower surface of the third ring (30) being a plane with an annular triangular recess (34) formed in a center of the lower surface of the third ring;

an upper surface of the fourth ring (40) being a plane with an annular triangular recess (43) formed in a center of the lower surface of the fourth ring; an lower surface of the fourth ring (40) being inclined upwards from the fourth inner cylinder (41) to the fourth outer cylinder (42); and a lower surface of the fifth ring (50) being inclined downwards from the fifth outer cylinder (52) to the fifth inner cylinder (51); a lower surface of the fifth ring (50) being a flat surface between a lower edge of the fifth inner cylinder (51) and a lower edge of the fifth outer cylinder (52) and being vertical to the axis of the fifth inner cylinder (51) and fifth outer cylinders (52); and wherein in installation, the first, second, third, fourth and fifth rings are sequentially overlapped one by one so that all the inner cylinders (11, 21, 31, 41 and 51) are formed along a smooth inner surface and all the outer cylinders (12, 22, 32, 42 and 52) are formed as a smooth outer surface so as to have a very tightly fluid sealed structure.

2. The flexible stuffing box packing assembly as claimed in claim 1, wherein an inclination of the upper surface of the second ring (20) is greater than that of the lower surface of the first ring (10) so that when second ring is overlapped with the first ring, a gap is formed therebetween.

3. The flexible stuffing box packing assembly as claimed in claim 2, wherein the fourth ring (40) is symmetrical to the second ring (20) along a plane between the second and fourth rings; and plane is parallel to an axial plane of the second ring.

4. The flexible stuffing box packing assembly as claimed in claim 3, wherein an axial length of the fifth inner cylinder (51) is shorter than that of the first inner cylinder (11); and an axial length of the fifth outer cylinder (52) is longer than that of the first outré outer cylinder (12).

5. The flexible stuffing box packing assembly as claimed in claim 4, wherein an inclination of the upper surface of the fifth ring (50) is greater than that of the lower surface of the fourth ring (40) so that when the fifth ring (50) is overlapped with the fourth ring (40), a gap is formed therebetween.

\* \* \* \* \*